(12) United States Patent
Ku (10) Patent No.: US 9,033,368 B2
(45) Date of Patent: May 19, 2015

(54) TILT OR TILT AND TELESCOPIC STEERING APPARATUS FOR VEHICLE

(71) Applicant: MANDO CORPORATION, Pyeongtaek-si (KR)

(72) Inventor: Sang Chul Ku, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/288,915

(22) Filed: May 28, 2014

(65) Prior Publication Data
US 2014/0352482 A1    Dec. 4, 2014

(30) Foreign Application Priority Data
May 30, 2013    (KR) .................. 10-2013-0061784

(51) Int. Cl.
*B62D 1/18*    (2006.01)
*B62D 1/187*    (2006.01)
*B62D 1/184*    (2006.01)

(52) U.S. Cl.
CPC ................ *B62D 1/187* (2013.01); *B62D 1/184* (2013.01)

(58) Field of Classification Search
USPC .............................. 280/775, 779; 74/493, 495
See application file for complete search history.

(56) References Cited

U.S. PATENT DOCUMENTS

| | | | | |
|---|---|---|---|---|
| 4,538,478 A * | 9/1985 | Sato et al. ........................ | 74/493 |
| 6,419,269 B1 * | 7/2002 | Manwaring et al. .......... | 280/775 |
| 8,186,242 B2 * | 5/2012 | Uesaka ............................ | 74/493 |
| 8,651,526 B2 * | 2/2014 | Nakamura et al. ............. | 280/777 |
| 8,899,128 B2 * | 12/2014 | Maniwa et al. .................. | 74/493 |
| 2002/0089161 A1 * | 7/2002 | Yamamura et al. ............ | 280/777 |
| 2005/0167962 A1 * | 8/2005 | Sato et al. ..................... | 280/775 |
| 2010/0219624 A1 * | 9/2010 | Matsuno ........................ | 280/779 |
| 2010/0301593 A1 * | 12/2010 | Sakata ........................... | 280/775 |
| 2011/0175335 A1 * | 7/2011 | Takezawa et al. .............. | 280/775 |
| 2011/0227323 A1 * | 9/2011 | Osuka et al. ................... | 280/779 |

* cited by examiner

*Primary Examiner* — Toan To
(74) *Attorney, Agent, or Firm* — Ladas & Parry, LLP (57) ABSTRACT

The present invention relates to a tilt or tilt and telescopic steering apparatus for use in a vehicle. According to an exemplary embodiment of the present invention, a conventional structure, which should be provided with both of tilting fixing gears and telescopic fixing gears for locking after a tilt or tilt and telescopic operation, is improved in such a manner that the tilt or tilt and telescopic operation may be locked by a locking member and a linear protruding portion. As a result, an improper tooth-engagement phenomenon (tooth-on-tooth phenomenon) between gear teeth can be prevented, the tilt operation and the telescopic operation can be simultaneously locked, and required components can be reduced such that material costs can be reduced.

8 Claims, 7 Drawing Sheets

TILT OR TILT AND TELESCOPIC STEERING APPARATUS FOR VEHICLE

CROSS-REFERENCE TO RELATED APPLICATION

This application claims priority from and the benefit under 35 U.S.C. §119(a) of Korean Patent Application No. 10-2013-0061784, filed on May 30, 2013, which is hereby incorporated by reference for all purposes as if fully set forth herein.

BACKGROUND OF THE INVENTION

1. Field of the invention

The present invention relates to a tilt or tilt and telescopic steering apparatus for use in a vehicle. More particularly, the present invention relates to a tilt or tilt and telescopic steering apparatus for use in a vehicle, in which a conventional structure, which should be provided with both of tilting fixing gears and telescopic fixing gears for locking after a tilt or tilt and telescopic operation, is improved in such a manner that the tilt or tilt and telescopic operation may be locked by a locking member and a linear protruding portion, so that an improper tooth-engagement phenomenon (tooth-on-tooth phenomenon) between gear teeth can be prevented, the tilt operation and the telescopic operation can be simultaneously locked, and required components can be reduced such that material costs can be reduced.

2. Description of the Prior Art

Figure 1:
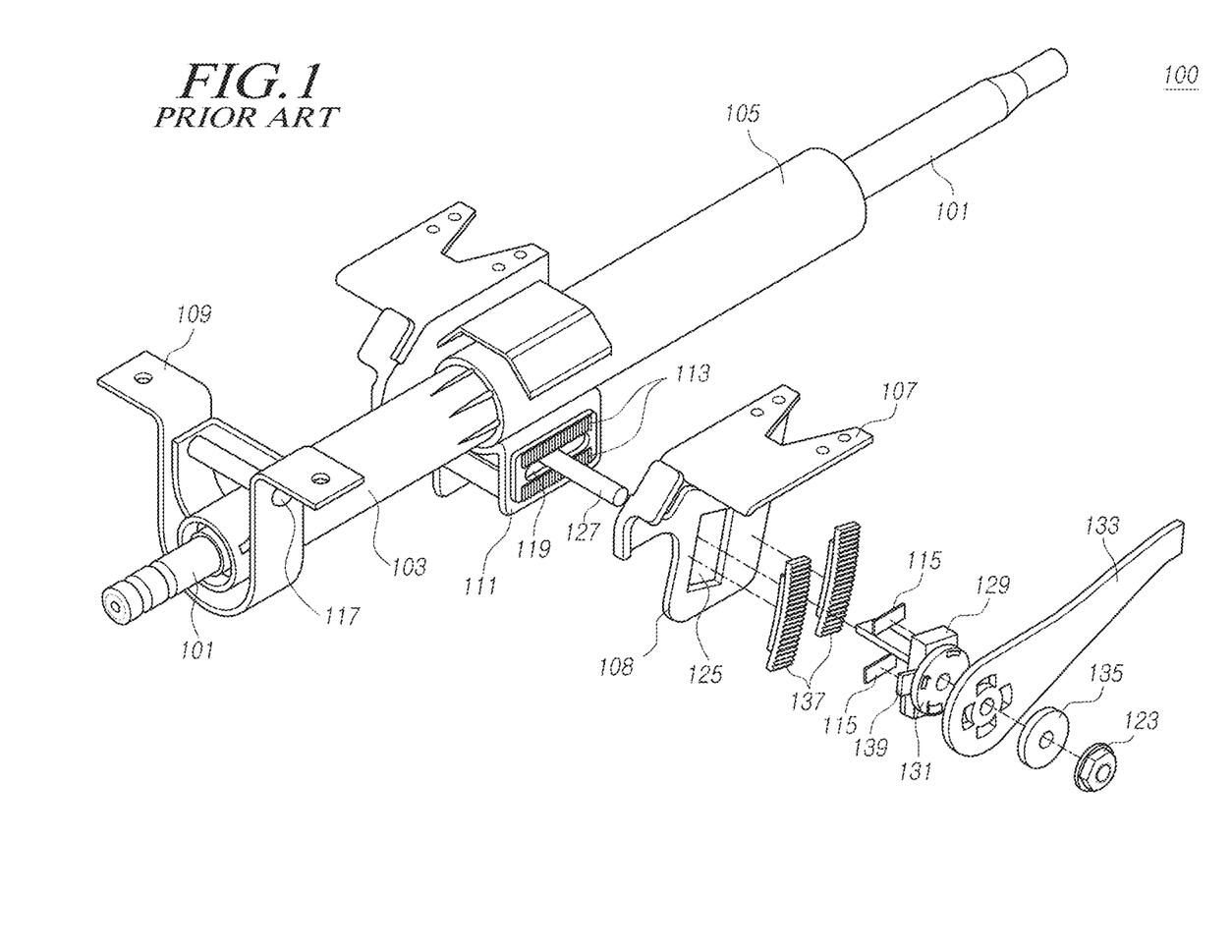
FIG. 1 is a partially exploded perspective view illustrating a conventional tilt or tilt and telescopic steering apparatus for a vehicle.

FIG. 1 is a partial exploded perspective view of a tilt or tilt and telescopic steering apparatus for a vehicle.

As illustrated in FIG. 1, a conventional tilt or tilt and telescopic steering apparatus 100 for a vehicle includes: an outer tube 105 positioned outside an inner tube 103 to enclose a part of the inner tube 103; the inner tube 103 configured to enclose a steering shaft 101 and to be movable inside the outer tube 105; a mounting bracket 107 installed to be capable of supporting the outer tube 105 on a vehicle body; a support portion 108 formed with a slit 125 being provided on a lower portion of the mounting bracket 107; a hinge bracket 109 installed to interconnect a hinge 117 connected with the inner tube 103 and the vehicle body; a lower support member 111 fixedly installed on a lower part of the outer tube 105; slots 119 being formed on both sides of the lower support member 111; an adjustment bolt 127 connected through the slots 119 of the lower support member 111 and through an adjustment nut 123; a cam 131 fixedly installed on a moving gear block 129 and fitted on the adjustment bolt 127; a protrusion being provided on a front surface of the cam to form a space for tilt and telescopic adjustment at the time of release action; an adjustment lever 133 provided with a structure corresponding to the cam 131 and fitted on the adjustment bolt 127; and the adjustment nut 123 fitted on an end of the adjustment bolt 127 together with a bush 135 and provided outside the adjustment lever 133.

Meanwhile, the tilt and telescopic locking apparatus includes the moving gear block 129, a first telescopic fixing gear 113, a second telescopic fixing gear 115, a first tilting fixing gear 137, and a second tilting fixing gear 139.

The moving gear block 129 is fitted on the adjustment bolt 127, and the first telescopic fixing gear 113 is fixedly installed on the outside of the lower support member 111. The second telescopic fixing gear 115 is installed widthwise on the inside of the moving gear block 129 to be correspondingly tooth-engaged with the teeth of the first telescopic fixing gear 113. The first tilting fixing gear 137 has an arc shape and is fixedly installed on the outside of the support portion 108 of the mounting bracket 107, and the second tilting fixing gear 139 is fixedly installed widthwise on the outside of the moving gear block 129 to be correspondingly tooth-engaged with the teeth of the first tilting fixing gear 137.

However, since the conventional tilt or tilt and telescopic steering apparatus for a vehicle which is configured as described above requires all of the moving gear block, the telescopic fixing gears, and the tilting fixing gears for locking after the tilt operation and the telescopic operation, the conventional tilt or tilt and telescopic steering apparatus has problems in that its structure is complicated, a lot of components are required and, thus, the material costs are high.

In addition, there is a problem in that, since an improper tooth-engagement phenomenon (tooth-on-tooth phenomenon) ocurres and thus, the gear teeth are not smoothly tooth-engaged with each other at the time of locking after the tilt operation and the telescopic operation, the tilt and telescopic locking is not smoothly completed.

SUMMARY OF THE INVENTION

The present invention has been made in this background, and an object of the present invention is to provide a tilt or tilt and telescopic steering apparatus for a vehicle, and more particularly, a tilt or tilt and telescopic steering apparatus which improves a conventional structure—which should be provided with both of tilting fixing gears and telescopic fixing gears for locking after a tilt or tilt and telescopic operation in such a manner that the tilt or tilt and telescopic operation may be locked by a locking member and a linear protruding portion, so that an improper tooth-engagement phenomenon (tooth-on-tooth phenomenon) between gear teeth can be prevented, the tilt operation and the telescopic operation can be simultaneously locked, and required components can be reduced such that the material costs can be reduced.

The object of present invention is not limited to the above-described object and other objects not described herein will be clearly understood from the following description by a person ordinarily skilled in the art.

According to an exemplary embodiment of the present invention, there is provided a tilt or tilt and telescopic steering apparatus for use in a vehicle. The steering wheel includes: a plate bracket extending on both sides of a telescopic guide portion protruding on an outer circumferential surface of an outer tube, the telescopic guide portion being formed with an axial telescopic elongated hole and the plate bracket being formed with tilt elongated holes which face each other; a cam member including a fixed cam which is coupled to one side of the plate bracket and formed with several first protrusions on one side thereof, and an operating cam which is coupled to a control lever and formed with several second protrusions, the second protrusions correspondingly abutting on the first protrusions; an adjustment bolt extending through the telescopic elongated hole and the tilt elongated holes, the cam member being coupled to one end of the adjustment bolt and a head portion being formed on the other end of the adjustment bolt; a linear protruding portion formed on an outer surface of the telescopic guide portion along the telescopic elongated hole; and a locking member coupled to one side of the plate bracket facing the linear protruding portion, the locking member being formed with a slot in a tilt direction and several rolling members being provided in the slot such that, when the control lever is locked, the linear protruding portion is inserted between the rolling members to lock the tilt or tilt and telescopic operation.

According to the exemplary embodiment of the present invention, a conventional structure—which should be provided with both tilting fixing gears and telescopic fixing gears for locking after a tilt or tilt and telescopic operation—is improved in such a manner that the tilt or tilt and telescopic operation may be locked by a locking member and a linear protruding portion. As a result, an improper tooth-engagement phenomenon (tooth-on-tooth phenomenon) between gear teeth can be prevented, the tilt operation and the telescopic operation can be simultaneously locked, and required components can be reduced such that material costs can be reduced.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, some exemplary embodiments of the present invention will be described in detail with reference to illustrative drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
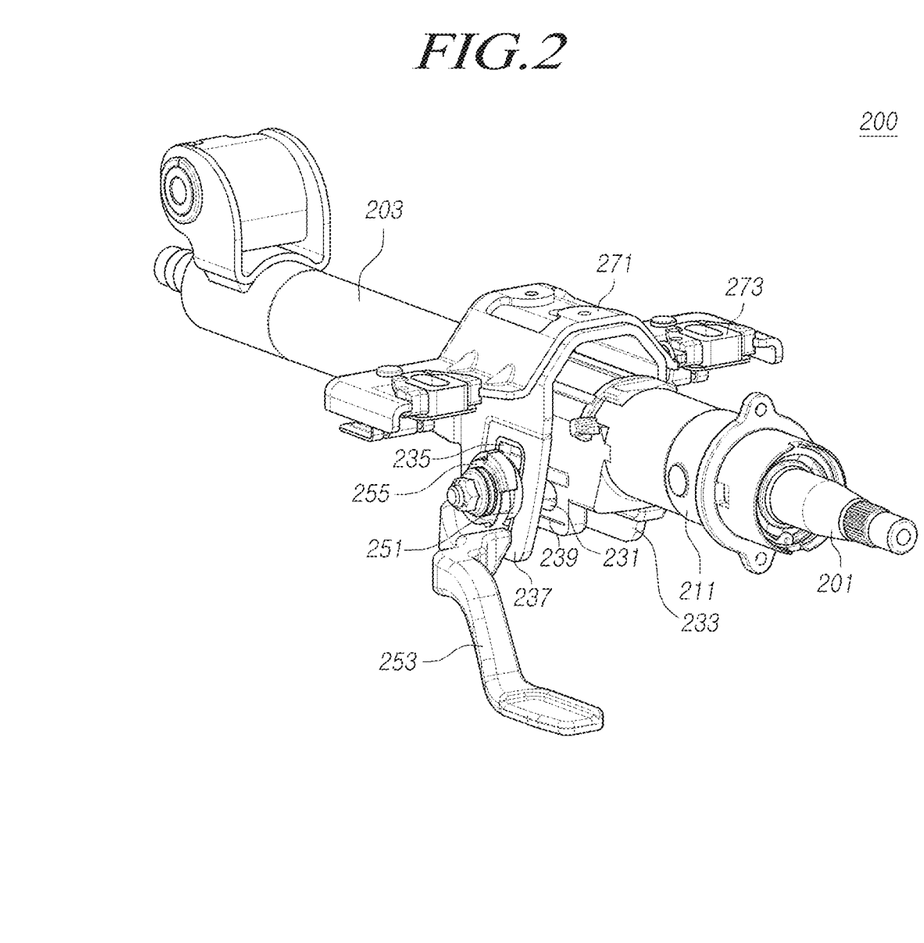
FIG. 2 is a perspective view illustrating a tilt or tilt and telescopic steering apparatus for a vehicle according to an exemplary embodiment of the present invention.
Figure 3:
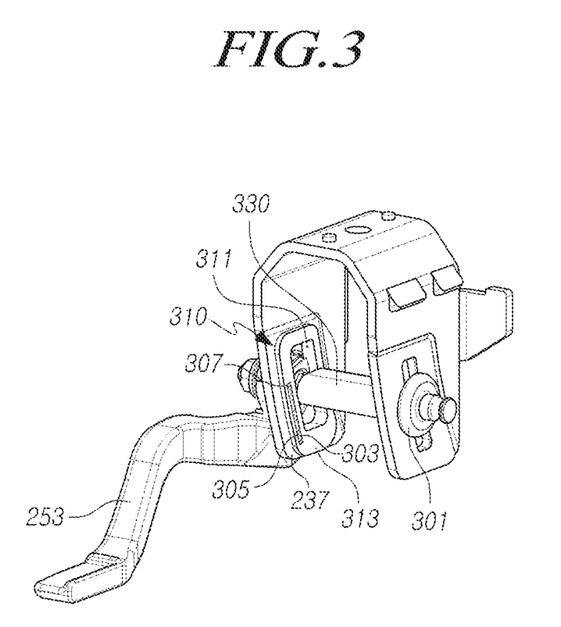
FIG. 3 is a perspective view illustrating a part of FIG. 2.
Figure 4:
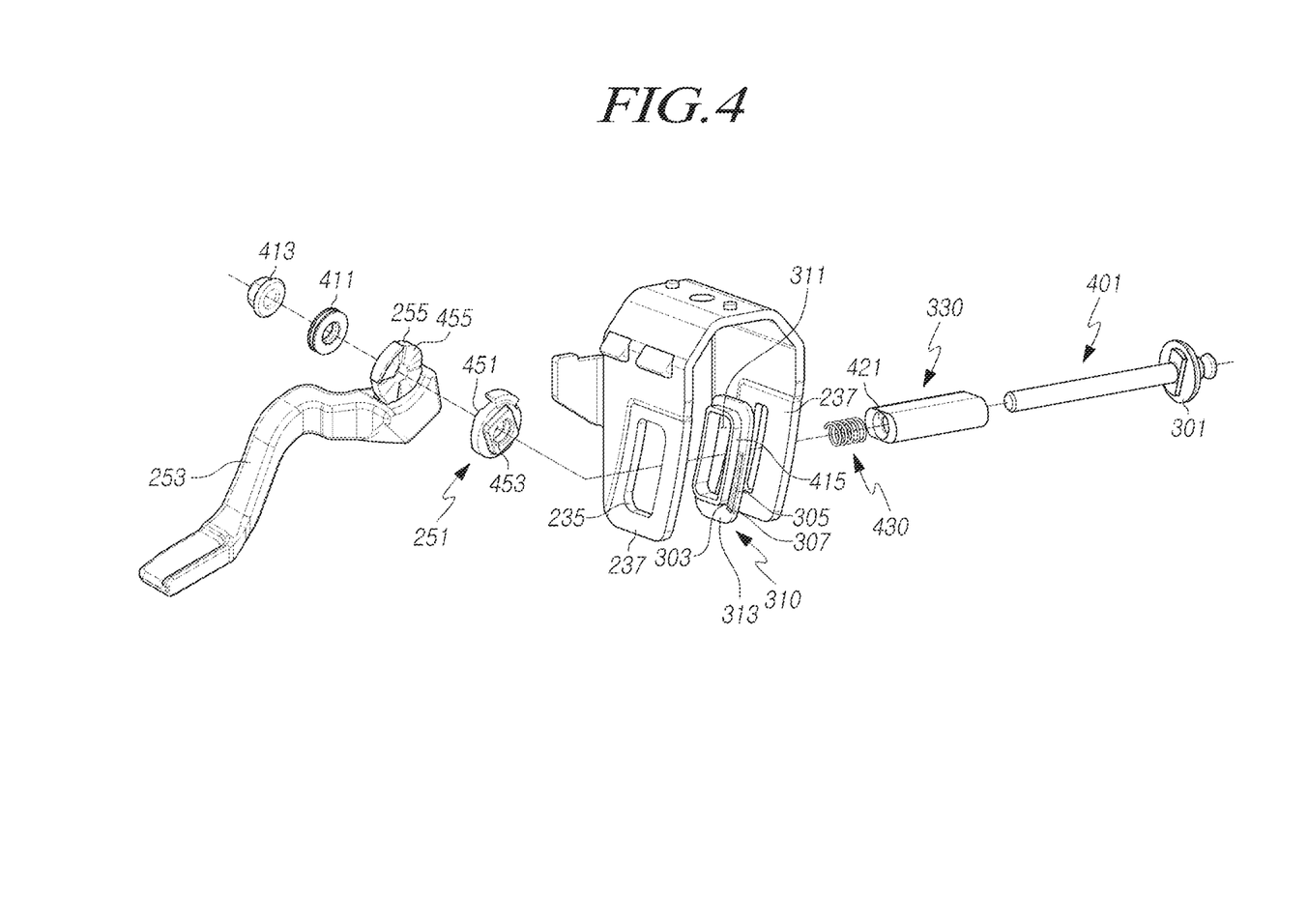
FIG. 4 is an exploded perspective view of FIG. 3.
Figure 5:
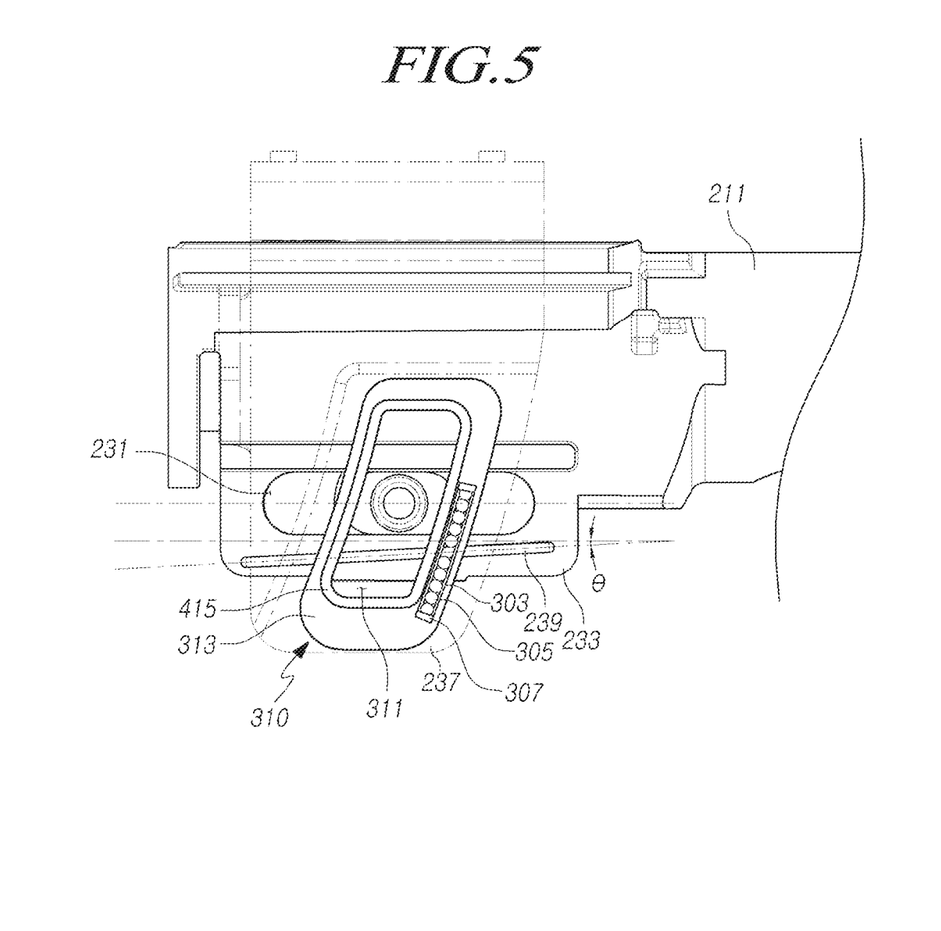
FIG. 5 is a side view of FIG. 2.
Figure 6:
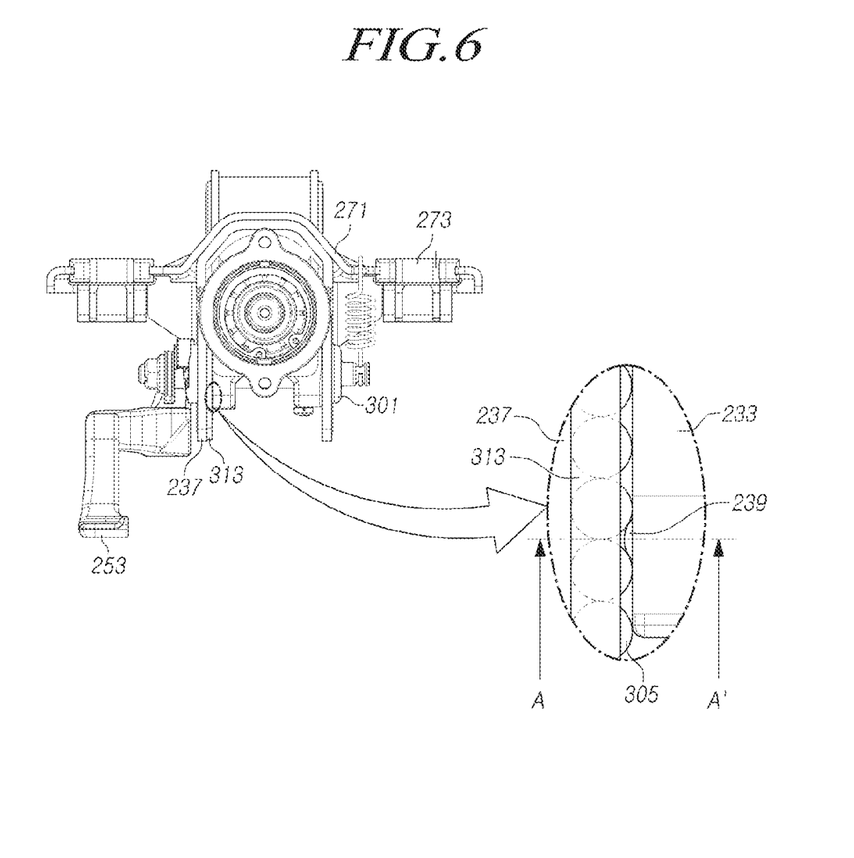
FIG. 6 is an enlarged view of a part of FIG. 2.
Figure 7:
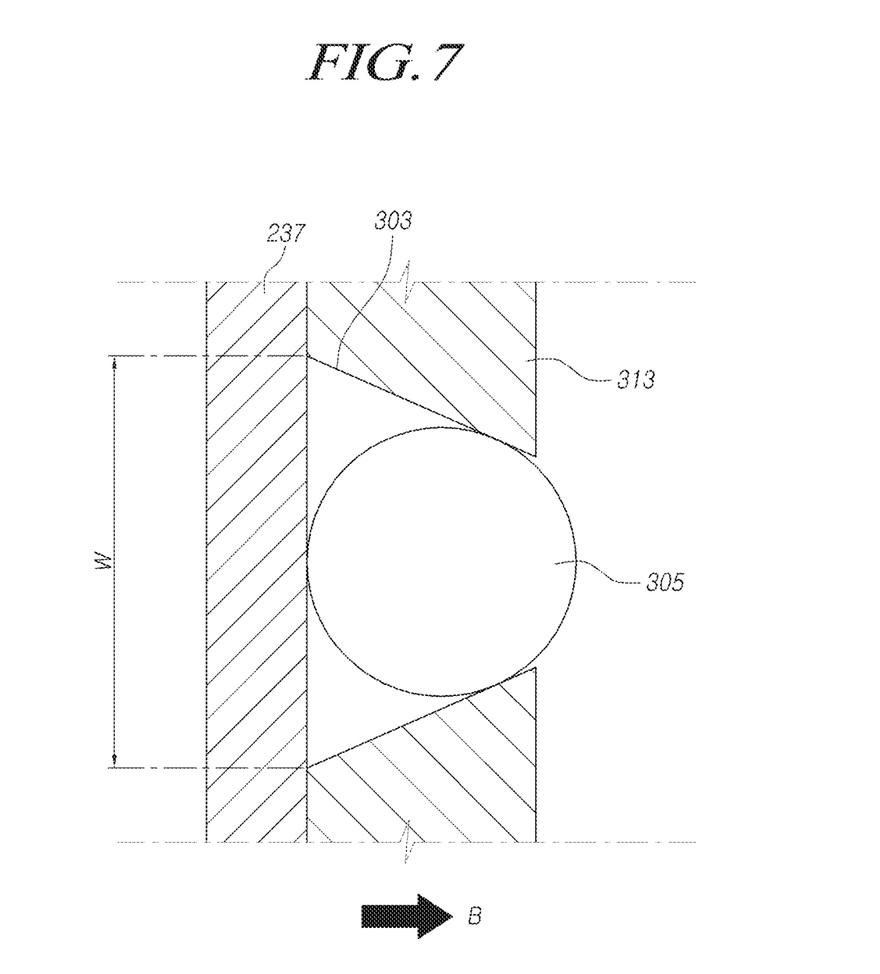
FIG. 7 is a cross-sectional view taken along line A-A' in FIG. 6.

FIG. 2 is a perspective view illustrating a tilt or tilt and telescopic steering apparatus for a vehicle according to an exemplary embodiment of the present invention. FIG. 3 is a perspective view illustrating a part of FIG. 2. FIG. 4 is an exploded perspective view of FIG. 3. FIG. 5 is a side view of FIG. 2. FIG. 6 is an enlarged view of a part of FIG. 2. FIG. 7 is a cross-sectional view taken along line A-A' in FIG. 6.

As illustrated in the drawings, according to an exemplary embodiment of the present invention, a tilt or tilt and telescopic steering apparatus 200 for use in a vehicle includes: a plate bracket 237 extending on both sides of a telescopic guide portion 233 protruding on outer circumferential surface of an outer tube 211, the telescopic guide portion 233 being formed with an axial telescopic elongated hole 321 and the plate bracket 233 being formed with tilt elongated holes 235 which face each other; a cam member including a fixed cam 251, which is coupled to one side of the plate bracket 237 and formed with several first protrusions 451 on one side thereof, and an operating cam 255, which is coupled to a control lever 253 and formed with several second protrusions 455, the second protrusions 455 correspondingly abutting on the first protrusions 451; an adjustment bolt 401 extending through the telescopic elongated hole 231 and the tilt elongated holes 235, the cam member being coupled to one end of the adjustment bolt 401 and a head portion 301 being formed on the other end of the adjustment bolt 401; a linear protruding portion 239 formed on an outer surface of the telescopic guide portion 233 along the telescopic elongated hole 231; and a locking member 310 coupled to one side of the plate bracket 237 facing the linear protruding portion 239, the locking member 310 being formed with a slot 303 in a tilt direction and several rolling members 305 being provided in the slot 303 such that, when the control lever 253 is locked, the linear protruding portion 239 is inserted between the rolling members 305 to lock the tilt or tilt and telescopic operation.

An inner tube 203 is formed in a hollow tube shape and a steering shaft 201 is inserted into the inner tube 203.

The outer tube 211 is formed in a hollow tube shape, and the inner tube 203 is inserted into the outer tube 211.

Meanwhile, the telescopic guide portion 233 protrudes on the outer circumferential surface of the outer tube 211, and the telescopic elongated hole 231 is formed in the telescopic guide portion 233 in the axial direction. The plate bracket 237 extends on the both sides of the telescopic guide portion 233.

That is, the plate bracket 237 is formed in a substantially "∩" shape to wrap around the outer circumferential surface of the outer tube 211 and extend on the both sides of the telescopic guide portion 233. The tilt elongated holes 235 which face with each other are formed in the plate bracket 237. The plate bracket 237 is coupled with a mounting bracket 271, and the mounting bracket 271 is coupled to a vehicle body via capsules 273.

The cam member includes the fixed cam 251 and the operating cam 255 in which the fixed cam 251 is coupled to one side of the plate bracket 237 and has a structure in which several first protrusions 451 are formed on one surface of the fixed cam 251.

In addition, the operating cam 255 is provided with second protrusions 455 which correspondingly abut on the first protrusions 451 of the fixed cam 251, and the operating cam 255 is coupled with the control lever 253. Thus, when a driver rotates the control lever 253 in one direction to lock the control lever 253, the second protrusions 455 of the operating cam 255 move along the first protrusions 451 of the fixed cam 251 such that the operating cam 255 and the fixed cam 251 are spaced apart from each other and the fixed cam 251 compresses and tightens the plate bracket 237, thereby locking the tilt or telescopic operation.

On the contrary, when the driver rotates the control lever 253 in the other direction to release the control lever 253, the operating cam 255 and the fixed cam 251, which have been spaced apart from each other, are returned to the original positions thereof such that the plate bracket 237, which has been compressed and tightened, are expanded, thereby allowing the tilt or telescopic operation.

Subsequently, the adjustment bolt 401 is coupled through the telescopic elongated hole 231 and the tilt elongated holes 235. The adjustment bolt 401 has a structure in which the cam member, a bearing 411, and a fixing nut 413 are sequentially fitted on one end of the adjustment bolt 401, and the head portion 301 is formed on the other end.

Meanwhile, the adjustment bolt 401 may be further provided with a support tube 330. That is, the support tube 330 is provided between the opposite portions of the plate bracket 237 and the adjustment bolt 401 is coupled through the support tube 330.

In addition, an elastic member 430 may be provided between the other surface of the fixed cam 251 and the support tube 330.

That is, the support tube 330 functions to support the elastic member 430. When the driver releases the control lever 253, the elastic member 430 pushes the fixed cam 251 outwardly in relation to the plate bracket 237 such that the plate bracket 237 is smoothly expanded. As a result, the linear protruding portion 239 is released from the rolling members 305 of the locking member 310 such that the linear protruding portion 239 and the rolling members 305 do not interfere with each other during the tilt or telescopic operation.

Meanwhile, the support tube 330 may be further formed with a stepped support recess 421 such that one end of the elastic member 430 is inserted into and supported in the support recess 421. In addition, on the other surface of the fixed cam 251, a stepped accommodation recess 453 may also be formed such that the other end of the elastic member 430 is inserted into and supported in the accommodation recess 453. When the support recess 421 and the accommodation recess 453 which support the opposite ends of the elastic member 430 are respectively formed on the support tube 330 and the other surface of the fixed cam 251 as described above, the elastic member 430 may be stably positioned between the fixed cam 251 and the support tube 330.

The linear protruding portion 239 is formed on the outer surface of the telescopic guide portion 233 along the telescopic elongated hole 231. When the driver locks the control lever 253, the linear protruding portion 239 is inserted between the rolling members 305 of the locking member 310 which will be described later, thereby locking the tilt operation.

That is, when the driver places the steering shaft 201 at a desired position and locks the control lever 253, the space between the opposite portions of the plate bracket 237 are narrowed by the action of the cam member and the linear protruding portion 239 is inserted between the rolling members 305 of the locking member 310. Accordingly, since the linear protruding portion 239 is fixedly positioned between the rolling members 305 such that the steering shaft 201 cannot move in the tilt direction any more, the tilt operation is locked.

In addition, when the tilt operation is locked by the linear protruding portion 239 and the rolling members 305 of the locking members 310, it is possible to solve the problem in the conventional tilt locking structure using gear teeth in which tooth-engagement between the gear teeth is not smoothly performed (tooth-on-tooth phenomenon) and, thus, tilt locking is not smoothly performed.

Meanwhile, as illustrated in FIG. 5, the linear protruding portion 239 may be formed to be inclined by a predetermined angle θ in relation to the longitudinal direction of the telescopic elongated hole 231. When the linear protruding portion 239 is formed to be inclined, the telescopic operation may be locked simultaneously when the driver locks the tilt operation. The predetermined angle θ may range, for example, 3° to 5°.

That is, when the linear protruding portion 239 is formed to be inclined by the predetermined angle θ in relation to the longitudinal direction of the telescopic elongated hole 231, the linear protruding portion 239 is inserted between the rolling members 305 of the locking member 310 such that the tilt operation is locked when the driver locks the control lever 253. Then, since the outer tube 211 which comes into close contact with the plate bracket 237 coupled with the locking member 310 to be positionally fixed cannot move in the telescopic direction any more, the telescopic operation is also automatically locked.

The linear protruding portion 239 may have a cross-section of a rounded curve shape. For example, the linear protruding portion 239 may be fabricated as a separate component and press fitted to the outer surface of the telescopic guide portion 233.

Subsequently, the locking member 310 is coupled to one side of the plate bracket 237 which faces the linear protruding portion 239, and the several rolling members 305 are provided in the slot 303 formed in the tilt direction. Thus, when the control lever 253 is locked, the linear protruding portion 239 is inserted between the rolling members 305 to lock the tilt or tilt and telescopic operation.

An example of such a locking member 310 will be described in more detail. The locking member 310 includes: a support portion 313 closely contacted with an inner surface of one side of the plate bracket 237, the support portion 313 including a through-hole 311 formed at a center of the support portion 313 to correspond to the tilt elongated holes 235, and a slot 303 formed on a side of the through-hole 311 and provided with rolling members 305; and an elongated rib 415 formed to extend around the through-hole 311 to be inserted into the telescopic elongated hole 235.

The support portion 313 may be formed in a plate shape which is formed with the through-hole 311 at the center thereof, in which the support portion 313 is closely contacted with an inner surface of one side of the plate bracket 237 and the slot 303 provided with the rolling members 305 is formed on a side of the through-hole 311.

Here, as illustrated in FIG. 7, the slot 303 is formed such that its width W is gradually reduced toward the telescopic guide portion 233 (i.e., in the direction indicated by arrow B in FIG. 7). Therefore, the rolling members 305 provided in the slot 303 are not released to the outside of the slot 303 but are partially exposed to the outside of the slot 303. The rolling members 305 are formed, for example, in a spherical shape.

When the slot 303 is formed as described above, the linear protruding portion 239 may be smoothly inserted between the rolling members 305, which are partially exposed to the outside of the slot 303 at the time of locking the tilt or telescopic operation.

Meanwhile, an elastic support 307 is further provided in one side or each side of the slot 303 in the tilt direction, in which such an elastic support 307 may be formed in a block shape of an elastic material to be coupled to each side or one side of the slot 303 in the tilt direction. The drawings illustrate an example in which the elastic support 307 is provided in each side of the slot 303 in the tilt direction.

When the elastic support 307 is provided in each side or one side of the slot 303 in the tilt direction, the rolling members 305 may be smoothly moved along the slot 303 when the linear protruding portion 239 is inserted between the rolling members 305 at the time of locking the tilt or telescopic operation, and the shock may be absorbed when the rolling members 305 hit either side of the slot 303 in the tilt direction.

An operation example of the tilt or tilt and telescopic steering apparatus for a vehicle according to an exemplary embodiment of the present invention will be described with reference to the drawings.

When the driver locks the control lever 253, the operating cam 255 and the fixed cam 251 are spaced apart from each other, and the adjustment bolt 401 is pulled in one direction (i.e. in the direction where the head portion 301 compresses the plate bracket 237). As a result, the space between the opposite portions of the plate brackets 237 is narrowed, and the linear protruding portion 239 is inserted between the rolling members 305 of the locking member 310 so that tilt operation is completed and locked.

At this time, when the linear protruding portion 239 is formed to be inclined by a predetermined angle θ in relation to the longitudinal direction of the telescopic elongated hole 231, the telescopic operation is also completed and locked.

On the contrary, when the driver releases the control lever 253, the operating cam 255 and the fixed cam 251, which have been spaced apart from each other, are returned to the original positions thereof, and the adjustment bolt 401 is moved in the other direction. As a result, the narrowed space between the plate brackets 237 is expanded, and the linear protruding portion 239, which has been inserted between the rolling members 305 of the locking member 310, is released. At the same time, the fixed cam 251 is moved to the outside of the corresponding plate bracket 237 by the elastic force of the elastic member 430, one end of which is supported on the support tube 330. As a result, the linear protruding portion 239 may be easily released from the rolling members 305, and thus, the tilt or tilt and telescopic operation can be performed.

As described above, according to the exemplary embodiments of the present invention, a conventional structure, which should be provided with both of tilting fixing gears and telescopic fixing gears for locking after a tilt or tilt and telescopic operation, is improved in such a manner that the tilt or tilt and telescopic operation may be locked by a locking member and a linear protruding portion. As a result, an improper tooth-engagement phenomenon (tooth-on-tooth phenomenon) between gear teeth can be prevented, the tilt operation and the telescopic operation can be simultaneously locked, and required components can be reduced such that material costs can be reduced.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. A tilt or tilt and telescopic steering apparatus for use in a vehicle, the steering wheel comprising:
   plate brackets provided on both sides of a telescopic guide portion protruding on outer circumferential surface of an outer tube, the telescopic guide portion being formed with an axial telescopic elongated hole and the plate brackets being formed with tilt elongated holes which face each other;
   a cam member including a fixed cam, which is coupled to one of the plate brackets and formed with several first protrusions on one side thereof, and an operating cam, which is coupled to a control lever and formed with several second protrusions, the second protrusions correspondingly abutting on the first protrusions;
   an adjustment bolt extending through the telescopic elongated hole and the tilt elongated holes, the cam member being coupled to one end of the adjustment bolt and a head portion 301 being formed on the other end of the adjustment bolt;
   a linear protruding portion formed on an outer surface of the telescopic guide portion along the telescopic elongated hole; and
   a locking member coupled to the plate bracket facing the linear protruding portion, the locking member being formed with a slot in a tilt direction and several rolling members being provided in the slot such that, when the control lever is locked, the linear protruding portion is inserted between the rolling members to lock the tilt or tilt and telescopic operation.

2. The steering wheel of claim 1, wherein the locking member includes:
   a support portion which is in close contact with an inner surface of one of the plate brackets, the support portion including a through-hole formed at a center of the support portion to correspond to the tilt elongated holes and a slot formed on a side of the through-hole and provided with rolling members; and
   an elongated rib formed to extend around the through-hole to be inserted into the telescopic elongated hole.

3. The steering wheel of claim 1, further comprising:
   an elastic support provided in the slot at one side or each side of the slit in a tilt direction.

4. The steering wheel of claim 2, wherein the slot is formed to have a width that is gradually reduced toward the telescopic guide portion.

5. The steering wheel of claim 1, further comprising:
   a support tube provided between the plate brackets, the adjustment bolt being coupled through the support tube; and
   an elastic member provided between on the other surface of the fixed cam and the support tube.

6. The steering wheel of claim 5, wherein a support recess is formed in the support tube such that one end of the elastic member is inserted into and supported in the support recess.

7. The steering wheel of claim 6, wherein an accommodation recess is formed on the other surface of the fixed cam such that the other end of the elastic member is inserted into and supported in the accommodation recess.

8. The steering wheel of claim 1, wherein the linear protruding portion is formed to be inclined by a predetermined angle in relation to a longitudinal direction of the telescopic elongated hole.

* * * * *